United States Patent [19]
Fisher et al.

[11] Patent Number: 5,222,561
[45] Date of Patent: Jun. 29, 1993

[54] SHOES AND PADS FOR HORSES

[75] Inventors: Richard A. Fisher, Barrington Hills, Ill.; Julius J. Bonini, Munster, Ind.; Michael J. McGuire, Westchester; Gareth Rostoker, Glenwood, both of Ill.

[73] Assignee: Rostoker, Inc., Burnham, Ill.

[21] Appl. No.: 959,085

[22] Filed: Oct. 9, 1992

[51] Int. Cl.5 .............................. A01L 1/00; A01L 5/00
[52] U.S. Cl. .......................................... 168/12; 168/4; 168/DIG. 1
[58] Field of Search ............ 168/4, 12, 14, 28, DIG. 1

[56] References Cited

U.S. PATENT DOCUMENTS

| 539,058 | 5/1895 | Jerome | 168/4 |
| 776,925 | 12/1904 | Miller | 168/14 |
| 3,469,631 | 9/1969 | Becker | 168/4 |
| 3,494,422 | 2/1970 | Clark | 168/4 |
| 3,513,915 | 5/1970 | Sherman | 168/4 |
| 3,782,473 | 1/1974 | Spencer | 168/4 |
| 3,906,550 | 9/1975 | Rostoker et al. | 29/419 X |
| 4,206,811 | 6/1980 | Dallmer | 168/4 |
| 4,235,292 | 11/1980 | Dallmer | 168/4 |
| 4,496,002 | 1/1985 | Jones et al. | 168/4 |
| 4,993,494 | 2/1991 | Tuunanen | 168/4 |

FOREIGN PATENT DOCUMENTS 285549 2/1928 United Kingdom ................. 168/12

Primary Examiner—Robert P. Swiatek
Attorney, Agent, or Firm—Rockey, Rifkin and Ryther

[57] ABSTRACT

Shoes for horses are fabricated from a plastic material which is reinforced by kinked metal wire. The shoes are lightweight, readily formable, have good wear properties and are much easier on the horse than metal shoes. The reinforced plastic material is also useful for fabrication of hoof pads.

10 Claims, No Drawings

SHOES AND PADS FOR HORSES

FIELD OF THE INVENTION

This invention relates to shoes and pads suitable for use on horses or other animals needing hoof protection. The shoes and pads are fabricated from reinforced plastic material.

BACKGROUND OF THE INVENTION

Horseshoes are commonly made from metals such as steel or aluminum. Although such shoes give a measure of protection to the animal, they have certain drawbacks. The metal shoes have very little resilience or shock absorbing ability when the horse is ridden on hard surfaces and this may lead to lameness in the horse. Furthermore, such metal shoes add more weight than is desirable on race horses.

For these reasons, a number of attempts have been made to find lightweight, shock absorbent material for the fabrication of horseshoes. Use of a high molecular weight polyethylene is proposed in U.S. Pat. No. 4,496,002. In U.S. Pat. No. 3,513,915 a shoe is described which is made from a rubber sheet containing small metal fragments such as steel filings distributed throughout the rubber. Horseshoes made from polyurethanes are disclosed in U.S. Pat. Nos. 3,469,631 and 3,494,422. Further, in U.S. Pat. Nos. 4,206,811 and 4,235,292, horseshoes are made from plastic surrounding a steel yoke.

While the horseshoes described in the references cited overcome some of the drawbacks of metal horseshoes, there still exists a need for an economical, lightweight horseshoe with good resilience and wear-resistant properties that can be easily formed and attached to the horse's hooves.

We have now discovered a lightweight material with good wear-resistant properties. This material is suitable not only for making horseshoes, but also for making protective pads that are inserted between the horseshoes and the horse's hooves.

SUMMARY OF THE INVENTION

In accordance with the present invention, there is provided a lightweight, wear-resistant horseshoe or pad fabricated from plastic material reinforced by kinked metal wire.

Also provided, in accordance with this invention, is a horseshoe or pad fabricated from a plastic material reinforced by a porous metal fiber structure. The porous metal fiber structure is formed from a plurality of substantially sinusoidally shaped metal fiber strands.

Further provided in accordance with the invention is a horseshoe or pad fabricated from plastic material reinforced with a porous metal fiber structure wherein the plastic material occupies a preponderance of the voids in the porous metal fiber structure. The porous metal fiber structure is formed from a plurality of substantially sinusoidally shaped metal fiber strands.

DETAILED DESCRIPTION OF THE INVENTION

The horseshoes or pads of this invention are prepared by a multi-step process. In the first step of the process, kinked metal wire is compressed into the desired shape. The result is a horseshoe or pad with a porous metal fiber structure. In the next step of the process, the porous metal fiber structure is impregnated with a plastic material. The resulting product may be machined, shaped or surface finished as required to fabricate the final horseshoe or pad.

One way to prepare the porous metal fiber structure is disclosed in U.S. Pat. No. 3,906,550, the description of which is incorporated herein by reference in its entirety. In that patent, metal wire is first kinked to desired dimensions. The kinked wire is then cut into discrete lengths. Then, the lengths of wire are mechanically molded into the desired shape using constraining dyes and punches to give a three-dimensional mechanically interlocked network of metallic fibers. Optionally, the points of contact between the fibers may be metallurgically bonded by sintering if desired.

The desired kinking of the wire can be accomplished by passing the wire through a set of meshing gears. Preferably, the wire is kinked into a sinusoidal pattern before the sinusoidal wire is cut into the desired fiber lengths.

In a further modification of the process, the wire is kinked in a third dimension. This can be accomplished by oscillating the wire in a direction parallel to the axis of the meshing gears as the wire enters the gears. It is noted that the degree of interlock of the wire strands is substantially increased by kinking the original wire prior to cutting it. The additional kinking of the wire in the third dimension prior to cutting the wire further improves the interlocking capacity of the wires. The three-dimensionally kinked wire may also be bent into various shapes before or after it is cut. This provides even better interlocking of the strands.

Uncut, kinked wire can be compressed into the desired shape and density without cutting. This method of forming the porous metal structure may also be useful.

Any ductile metal wire can be kinked and used to form the porous metal fiber structure of the horseshoes of this invention. Common metal wires such as aluminum, copper, iron, nickel, cobalt, titanium and alloys thereof may be used.

Wires of the various metals and their alloys are commercially available in a variety of diameters. While wires ranging from 0.1 to 3 mm can be used for forming the horseshoe structure, it is preferable to use wires of a diameter from about 0.3 mm to about 0.6 mm.

As noted above, the wires used to make the horseshoes should be kinked in a sinusoidal fashion. A useful amplitude-to-period ratio for such a kinking is 0.34. Larger amplitude-to-period ratios can be used depending on the strength, ductility and diameter of the wire being kinked. Smaller amplitude-to-period ratios can be employed, but with a substantial decrease in wire interlock capacity. An amplitude-to-period ratio no smaller than about 0.2 is recommended.

In one embodiment of the invention, after the wire has been kinked in one direction and optionally kinked in additional directions, it is cut to specific lengths for consolidation. The length of cut can vary anywhere from as short as a few periods to as long as necessary, depending on the method of consolidation to be used. Typically, a minimum cut wire length is about 2.5 cm. Anything shorter than this significantly decreases interlocking capacity. Lengths longer than about 10–12 cm are typically not necessary for the horseshoe application. However, as noted above, a continuous kinked wire method can be used and, in that case, no multiple cutting of the wire is performed.

The kinked and, preferably, three-dimensionally kinked wire is formed into the desired shape for the horseshoe or pad. Closed die compression molding can be used to make individual horseshoes. Alternatively, the kinked wires can be dropped onto a moving belt at a controlled rate and the mat of wires consolidated by means of a series of rollers. This method generates a continuous sheet from which the horseshoe shapes or pads can be sectioned or further molded. The wire is compressed to such a density that the wire occupies from about 5 to about 80 volume percent of the fiber metal structure. However, it is preferred that the wire occupy a range of from about 20 to about 50 volume percent of the structure in order to provide adequate reinforcement without adding undue weight to the shoe or pad. The fiber metal structure is then from about 50 percent to about 80 percent porous.

In one embodiment of the invention, the individual wires of the porous fiber metal structure are bonded together at their points of contact. Such bonding provides greater strength to the structure. Suitable methods for bonding include sintering, brazing, soldering or adhesive bonding.

Once the porous fiber metal structure has been formed at the desired density into the desired shape, it is impregnated with a plastic material. This material, in conjunction with the kinked metal wire reinforcement, supports the horse's weight and provides improved energy absorption. A number of well-known polymers, such as polyethylene, polypropylene, polyurethane, polyamides and polyimides, can be used as the plastic material. They are introduced into the voids in the porous metal structure by conventional methods such as injection or compression molding.

Once the polymeric material has been injected into the metal fiber structure and cured, any desired surface finishing such as deburring, sanding, blasting and machining can be applied.

If it is desired to attach the shoes by conventional nailing, nail holes can be machined or molded into the shoe. Alternatively, the nail holes can be punched into the shoe by the farrier at the time of shoeing. These horseshoes and pads are also suitable for construction in shapes suitable for adhesive bonding to the horse's hoof by methods well-known in the trade.

Thus, there has been provided, in accordance with this invention, a lightweight energy absorbing material suitable for making horseshoes or pads. Although the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A horseshoe or pad fabricated from a plastic material reinforced by a porous metal fiber structure, said porous metal fiber structure being formed from a plurality of substantially sinusoidally shaped metal fiber strands.

2. A horseshoe or pad fabricated from a plastic material reinforced with a porous metal fiber structure wherein said plastic material occupies a preponderance of the voids in the porous metal fiber structure and wherein said porous metal fiber structure is formed from a plurality of substantially sinusoidally shaped metal fiber strands.

3. The horseshoe or pad of claim 2, wherein the sinusoidally shaped metal fiber strands are additionally kinked to give three-dimensionally kinked metal fiber strands.

4. The horseshoe or pad of claim 3, wherein the three-dimensionally kinked metal fiber strands are bent into various shapes.

5. The horseshoe or pad of claim 2, wherein the metal fiber strands are metallurgically bonded together at their points of contact.

6. The horseshoe or pad of claim 2, wherein said metal fiber structure is from about 50 percent to about 80 percent porous.

7. The horseshoe or pad of claim 2, wherein the diameter of said metal fiber strands is from about 0.1 mm to about 3 mm.

8. The horseshoe or pad of claim 7, wherein the diameter of said metal fiber strands is from about 0.3 mm to about 0.6 mm.

9. The horseshoe or pad of claim 2, wherein the length of said metal fiber strands is from about 2.5 cm to about 12 cm.

10. The horseshoe or pad of claim 2, wherein the plastic material is selected from the group consisting of polyethylene, polypropylene, polyamides and polyimides.

* * * * *